United States Patent [19]

Lefers et al.

[11] Patent Number: 5,158,754
[45] Date of Patent: Oct. 27, 1992

[54] PROCESS AND APPARATUS FOR EFFECTING CHEMICAL AND/OR PHYSICAL REACTIONS

[75] Inventors: Jan B. Lefers; Pieter Lodder, both of Arnhem, Netherlands

[73] Assignee: N. V. Kema, Arnhem, Netherlands

[21] Appl. No.: 609,806

[22] Filed: Nov. 6, 1990

[30] Foreign Application Priority Data

Nov. 6, 1989 [NL] Netherlands ............ 8902738

[51] Int. Cl.$^5$ ............................. B01J 8/04
[52] U.S. Cl. ............... 422/191; 422/139; 422/141; 422/143; 422/220; 55/226; 34/57 A
[58] Field of Search ............ 422/139, 141, 143, 145, 422/191, 192, 213, 216, 219, 232, 311, 218, 220, 278; 210/189; 55/91, 226; 34/57 A; 110/245; 222/129.3; 423/239

[56] References Cited

U.S. PATENT DOCUMENTS

| | | | |
|---|---|---|---|
| 1,686,349 | 10/1928 | Slade | 423/360 |
| 2,538,833 | 1/1951 | De Rycke | 34/57 A |
| 2,649,358 | 8/1953 | Palmer | 208/161 |
| 2,690,962 | 10/1954 | Clarke | 422/143 |
| 2,850,808 | 9/1958 | Jones et al. | 34/57 A |
| 2,884,373 | 10/1954 | Bailey | 208/132 |
| 2,903,800 | 9/1959 | Skoglund | 34/57 A |
| 2,933,824 | 4/1960 | Jones et al. | 34/57 A |
| 3,717,440 | 2/1973 | Cannon | 23/284 |
| 3,910,849 | 10/1975 | Kawabata et al. | 252/421 |
| 4,559,719 | 12/1985 | Dodson | 34/10 |
| 4,612,115 | 9/1986 | Titoff | 210/189 |
| 4,698,913 | 10/1987 | Voll | 34/10 |
| 4,824,360 | 4/1989 | Janke et al. | 431/7 |
| 4,847,054 | 7/1989 | Weisweiler | 423/239 |
| 4,855,111 | 8/1989 | Bader et al. | 422/122 |
| 4,973,457 | 11/1990 | Kongshuag et al. | 423/235 |

FOREIGN PATENT DOCUMENTS 748199 12/1966 Canada ............ 122/635

Primary Examiner—Robert J. Warden
Assistant Examiner—Christopher Y. Kim
Attorney, Agent, or Firm—Webb, Burden, Ziesenheim & Webb

[57] ABSTRACT

Disclosed are a process and apparatus for effecting chemical and/or physical reactions by means of solid-gas contact. The apparatus has a shaftlike reaction chamber widening in upward direction and divided into compartments by means of horizontal grids. The process is performed by introducing a particulate solid of about 0.5 to 5 millimeters particle size into the reaction chamber and passing a gas stream in upward direction through that chamber at an output sufficient to keep the particles in floating condition. A floating bed of solid particles will be formed in the reactor then and excellent solid-gas contact suitable for effecting chemical and physical reactions is provided hereby. A special embodiment relates to the removal of nitrogen oxides from flue gases with the aid of a particulate catalyst.

14 Claims, 3 Drawing Sheets

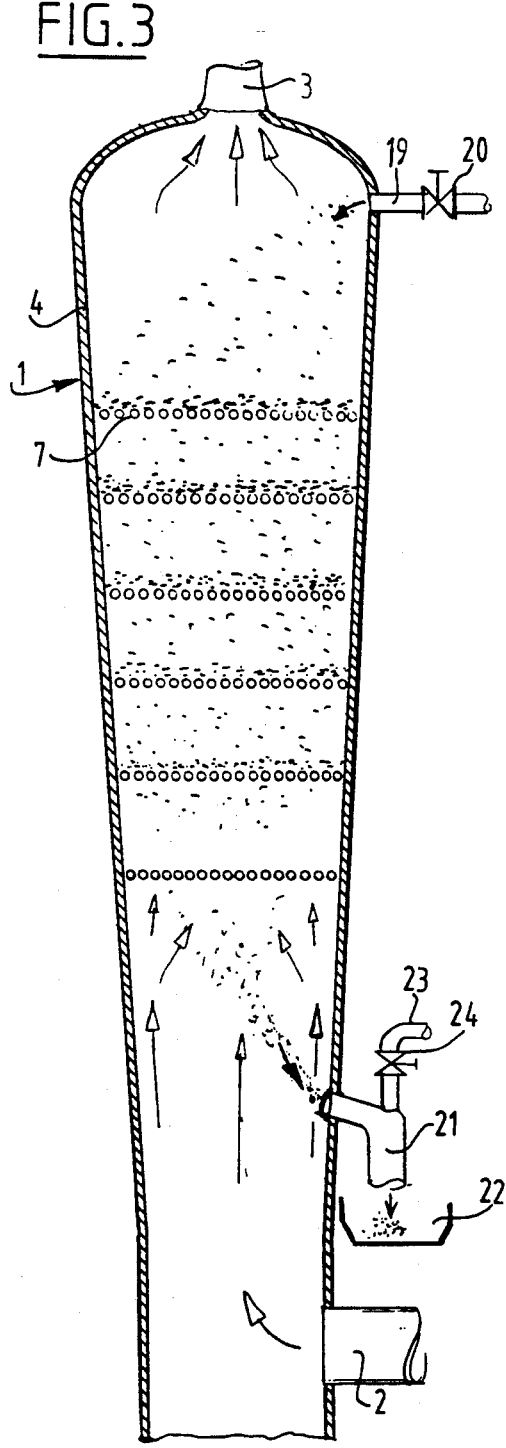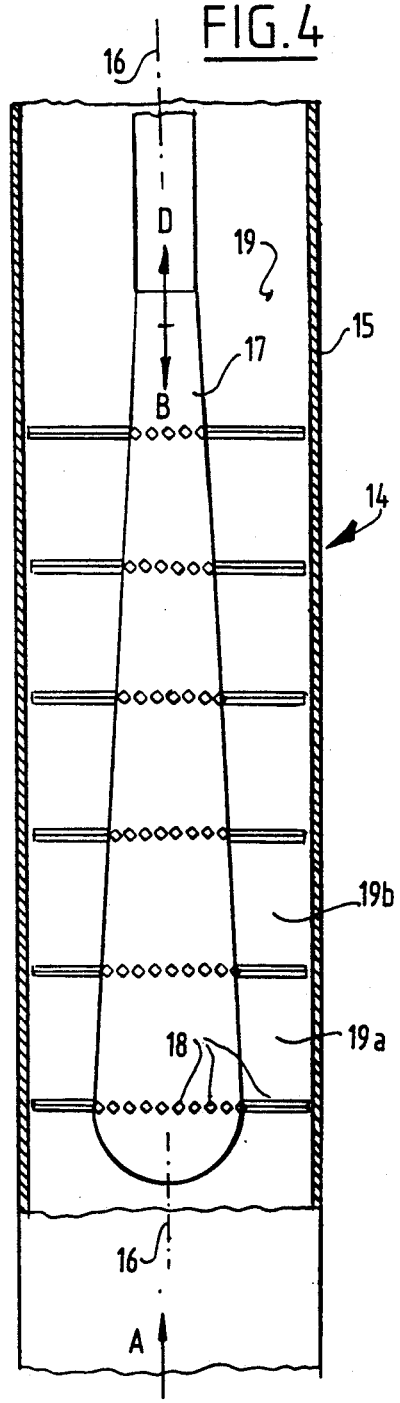

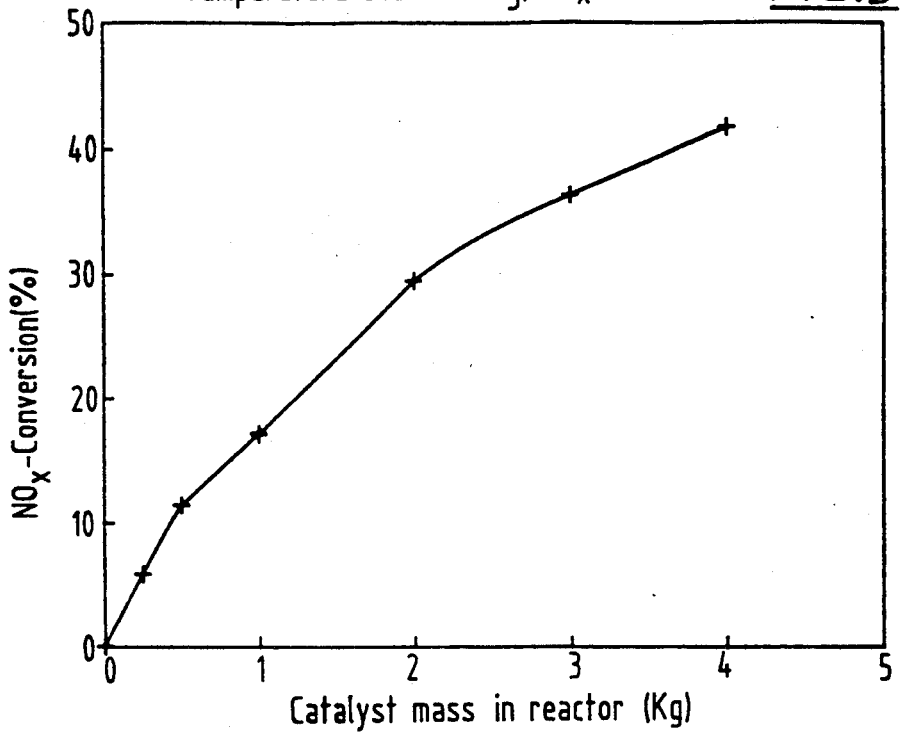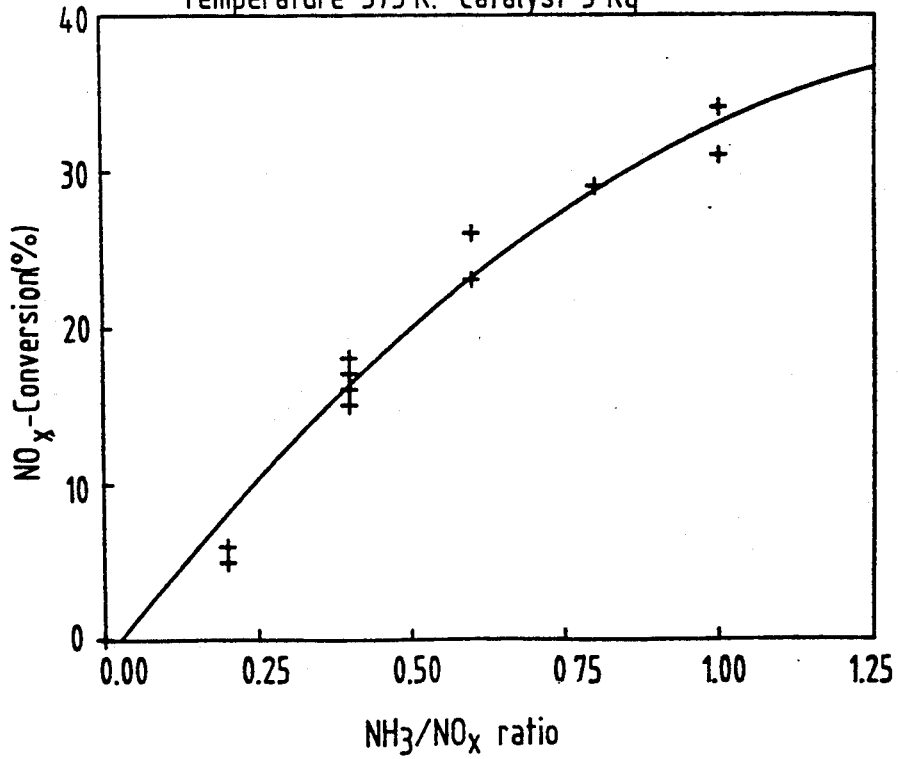

PROCESS AND APPARATUS FOR EFFECTING CHEMICAL AND/OR PHYSICAL REACTIONS

This invention relates to a process and apparatus for effecting chemical and/or physical reactions by means of solid-gas contact. The invention is particularly suitable for the removal of nitrogen oxides from flue gases but, in general, it may be used for many different applications.

A selection between various options can normally be made if reactions involving solid-gas contact have to be performed. Thus, processes using a so-called "solid bed" are known wherein the gas is passed through a densely packed layer of solids in the form of granules, rings or the like or passed along plates or walls made from these solids. Such processes are frequently used for chemical reactions including e.g. oxidation reactions, water gas reactions, ammonia or methanol synthesis reactions, and the like.

Further, processes utilizing a so-called "moving bed" are known, wherein a solid in particulate form (e.g. activated carbon) is flowing down through a reactor while a gas is passed in upward direction or crosswise direction through the flow of particles. Such processes are frequently used e.g. for absorbing gaseous or liquid components from a gas stream.

Still further, processes utilizing a so-called "fluidized bed" are known, wherein the solid is resting in particulate form on a distributor plate and a gas stream is passed in upward direction via the distributor plate through the layer of solid material. A sudden expansion of the layer of solid material will occur at a certain velocity of the gas stream, thus causing the individual particles carried by the gas to get into turbulence and providing the appearence of a boiling liquid. Such processes may find utilization e.g. in the combustion of solid fuels with air or oxygen.

All these processes have advantages and disadvantages which render them more or less suitable for certain applications.

The invention is likewise directed to the realization of solid-gas contact but makes use of another principle. A requirement thereto is a shaft-like reaction chamber widening in upward direction and divided into compartments by means of grids arranged crosswise to its longitudinal axis. If a particulate solid having a particle size between about 0.5 and about 5 mm is introduced into this reaction chamber and if a gas stream is moreover passed through the reaction chamber at an output sufficient to keep the solid particles in floating condition, it can be observed that the solid particles together form a "floating bed" which occupies some compartments in the reaction chamber and which, dependent from the gas stream output, is located at a higher or lower level within that reaction chamber. The distribution of solid particles within this floating bed is non-homogeneous because the greater part of the floating bed is composed of a thin phase having a relatively small concentration of solid particles whereas a small part of the bed is composed of a dense phase having a relatively high concentration of solid particles, said dense phase being carried in layer form by the grids within the bed (with the exception of a few grids in the lower part thereof). Thus, several grids within the bed carry a dense phase layer having over it a thin phase occupying the remaining part of the compartments above those grids. The solid particles in the dense phase are whirled up all the time, thus causing part of them to enter the thin phase and causing another part to return to the dense phase. The solid particles in the thin phase will move through a compartment along random paths and will sometimes enter a higher or lower compartment. Therefore, the individual particles are continuously moving whereas the boundaries of the floating bed as well as the division of the bed into dense and thin phases are kept constant during operation.

Due to the continuous movement of particles in the floating bed of solid particles thus formed, a good contact between solids and gas may be realized and transfer of energy and/or matter between them may be possible. Therefore, the process is exceptionally suited for effecting physical and/or chemical reactions.

When the floating bed is compared with a fluidized bed of solid particles, the following differences may be noted: the particles used in the formation of a floating bed are in general of somewhat larger size (from about 0.5 mm to about 5 mm) than the particles used in the formation of a fluidized bed (in most cases from about 0.1 mm to about 1.5 mm). The gas stream to be used should have sufficient output to keep the solid particles in floating condition, just as in the case of a fluidized bed, but a much greater variation in gas output may be used with a floating bed than with a fluidized bed, without risk of having the solid particles carried off from the reaction chamber by the gas stream. The most important difference, however, is that, contrary to the case of a fluidized bed, the distribution of solid particles about the resulting bed is non-homogeneous in the case of a floating bed, based upon the succession of dense and thin phases. Moreover, the average particle concentration in the dense phase is lower in the compartments at the bottom of the floating bed than in the compartments at the upper end thereof, whereas the dense phase layers in the floating bed, when viewed from the bottom upwards, are gradually becoming thicker (the dense phase first appears in the corners and along the edges of a grid and will thereupon fill gradually the more centrally located portions of the grids until at the upper end of the floating bed the whole surface of a grid has been covered with the dense phase).

Contrary to a fluidized bed, a floating bed has little tendency to form gas bubbles having a disturbing effect. Moreover, a floating bed has little tendency of "channeling" in the bed, due to stabilization by the grids. These are clear advantages. Further in a floating bed, it is possible to use a gas stream which contains particles of fine dust such as fly ash; such particles will not remain in the floating bed in view of their small size but will be dragged away with the gas stream and leave the reaction chamber at the outlet end. A further advantage is that the solid particles taking part in the formation of the floating bed will be subjected less to mutual collisions, thus allowing the attrition of these particles to be less than in a fluidized bed.

In a first aspect, the invention provides a process for effecting chemical and/or physical reactions by means of solid-gas contact, said process comprising the steps of introducing a particulate solid having a particle size between about 0.5 and about 5 millimeters into a shaft-like reaction chamber which widens upwardly and which is divided into compartments by means of grids arranged crosswise to its longitudinal axis, and passing a gas stream in upward direction through the reaction chamber at an output sufficient to keep the solid particles in floating condition and to accomplish the desired reactions through solid-gas contact.

Several variants to this process are possible. Thus, the solid particles may have any desired shape although spherical or substantially spherical particles are preferred. The particulate solid may be inert with regard to the gas stream but it may also be capable to adsorb components from the gas stream or to act upon the gas stream or to react with it. Likewise, the gas stream may be inert with regard to the particulate solid but it may also have components which act upon this solid or react with the solid. Further, the gas stream may have components which are adsorbed by the solid particles or removed in another way from the gas stream, as well as components such as fly ash which will pass undisturbed through the reaction chamber.

In most cases, the particulate solid introduced into the reaction chamber will remain in that chamber during operation and only the gas stream will be continuously passed through. Nevertheless, an embodiment is possible wherein the particulate solid is continuously supplied to the reaction chamber and is also removed continuously from the reaction chamber during operation. Such an embodiment has advantages if a transfer of matter between the gas stream and the solid particles is occuring during operation, to the effect that the solid particles are loaded with matter adsorbed from the gas stream. The particles removed from the reaction chamber may be regenerated at another location and may next be recycled to the reaction chamber.

The apparatus needed for effecting the process may be relatively simple and will comprise a reactor defining a shaftlike reaction chamber which widens upwardly and which has been divided into compartments by means of grids arranged crosswise to its longitudinal axis, said reactor having an inlet for particulate solids as well as a gas inlet at its bottom end and a gas outlet at its upper end. Several embodiments of this apparatus are possible.

In a suitable embodiment, the reactor comprises an elongated upright vessel having walls which enclose an inclination angle of at most 10° with the longitudinal axis of the vessel such that the interior reaction chamber widens upwardly. The above mentioned grids which divide the inner space into compartments are located inside the vessel and arranged crosswise to its longitudinal axis. Such an embodiment is simple in construction and may be used for many applications.

In another embodiment, the reactor comprises an elongated upright vessel having walls extending parallel to the longitudinal axis of the vessel and having an elongated body of upwardly diminishing cross-section arranged centrally inside the reaction vessel. In that embodiment, a shaftlike reaction chamber is formed between the central body and the walls of the reaction vessel and, just like in the first embodiment, this reaction chamber will be divided into compartments by means of grids arranged crosswise to the longitudinal axis of the vessel. This embodiment may also be used for several applications. If the central body in the reaction vessel has been arranged for up and down movement and if the grids are secured only to that central body, there is a possibility to act upon the operational conditions such as the position of the floating bed and the like, which may be advantageous in certain cases.

In both embodiments, the inlet for particulate solids will normally be located at the bottom of the reaction vessel. Should this inlet be connected to a storage vessel arranged below the reactor, then a special outlet for solids is not required since the solid particles will fall down by themselves at the end of the operation and will return to the storage vessel. Nevertheless, a variant is possible wherein the inlet for particulate solids is located at a position in the reactor wall and wherein an outlet for particulate solids is present at a higher or lower position in the reactor wall. In that case, the solid may be continuously supplied to the reaction chamber and may also be continuously removed from the reaction chamber during operation, which has the above mentioned advantages.

BRIEF DESCRIPTION OF THE DRAWINGS

The invention is further illustrated by the drawings which are given by way of example.

FIG. 3 is a variant to the embodiment of FIG. 1 and FIG. 2.

FIG. 4 shows schematically and in longitudinal section a second embodiment of the invented apparatus.

FIGS. 5 and 6 are graphical representations of test results obtained with the apparatus of FIGS. 1 and 2 according to Example 2.

Figure 1:
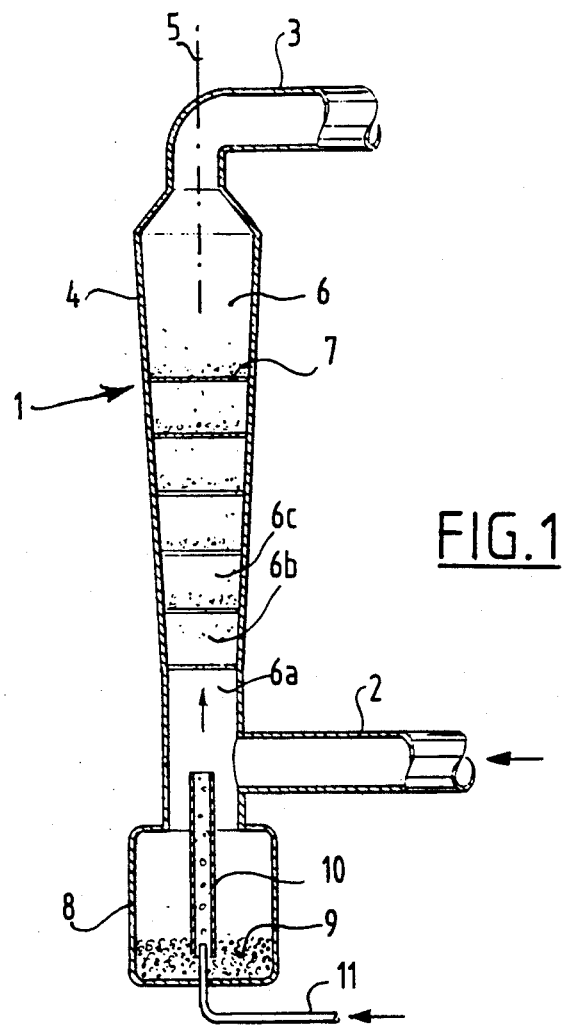
FIG. 1 shows schematically and in longitudinal section an embodiment of the invented apparatus.

The apparatus of FIG. 1 comprises an elongated upright reaction vessel 1 having a gas inlet 2 at its bottom end and a gas outlet 3 at its upper end. The walls 4, 4 of the vessel have a slightly inclined position with regard to the (vertical) longitudinal axis 5 so that the vessel gradually widens upwardly, i.e. gradually becomes larger in cross-section. The inner space (reaction chamber) 6 in vessel 1 has been divided into compartments 6a, 6b. . . etc. by means of a number of grids 7 arranged crosswise to the longitudinal axis 5. A storage vessel 8 for particulate solids 9 is located below reaction vessel 1 and said vessel 8 has been provided with an injector 10 and an inlet 11 for an auxiliary gas.

Figure 2:
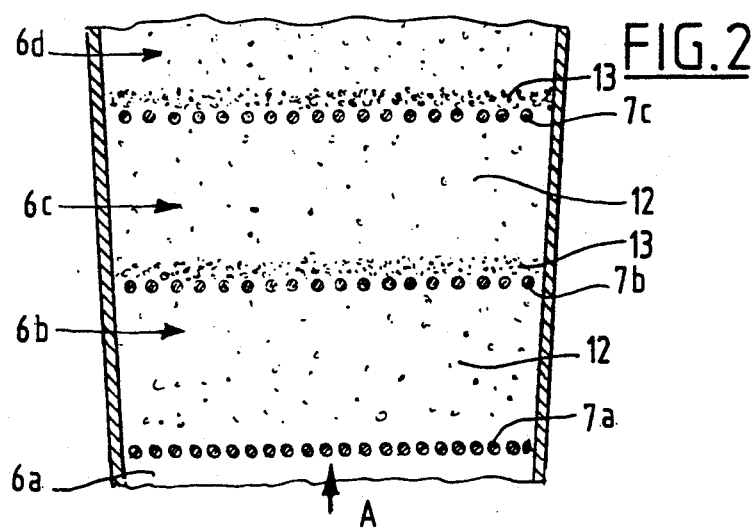
FIG. 2 shows a detail of the apparatus of FIG. 1 during operation and on a larger scale.

At the start of operations, a particulate solid 9 having a particle size between about 0.5 mm and about 5 mm is present in storage vessel 8. The particles of this solid are introduced into reaction vessel 1 through injector 10 by means of an auxiliary gas such as e.g. pressurized air. Moreover, a gas stream is passed in upward direction through the shaftlike reaction chamber 6 via inlet 2 and outlet 3, said gas stream having an output such that the solid particles 9 derived from injector 10 will attain a floating condition. A floating bed of solid particles is formed in reaction chamber 6 at a higher or lower level dependent from the gas stream out, and will occupy a number of compartments of reaction chamber 6 (for instance the first until and including the fifth compartment or else the third until and including the sixth compartment, calculated from the bottom). The distribution of solid particles inside this floating bed is non-homogeneous, like appearing from FIG. 2 which shows the situation in four compartments 6a, 6b, 6c, 6d, separated by grids 7a, 7b, 7c. It is presumed that the floating bed starts to be present in compartment 6b and that compartment 6a below compartment 6b is free of floating solid particles. The upward gas stream has been indicated with an arrow A. It will be noted that compartments 6b, 6c, 6d are filled up for the greater part with a thin phase 12 of solid particles and gas which has a relatively small concentration of solid particles (about 1% at the bottom compartment and increasing until about 20% or more in higher compartments). A small amount of a dense phase 13 also composed of solid particles and gas but having a relatively high concentration of solid particles (from about 40% to about 50%) is present next to the thin phase of the floating bed, starting with compartment 6c. This dense phase 13 has the form of layers supported directly by grids 7b, 7c etc., the thickness of these layers gradually increasing in higher located compartments. Thus, a layer of the dense phase 13 is present on most of the grids within the floating bed and has over it a thin phase 12 which fills up the rest of the compartment above the relative grid. The solid particles in the dense phase 13 are continuously whirled up, part of them entering the thin phase and another part of them returning to the dense phase. The solid particles in the thin phase 12 move through a compartment along random paths and will sometimes enter a higher or lower compartment. Thus, the individual particles are in continuous movement although the boundaries of the floating bed as well as the partition of the bed in dense and thin phases will be maintained during operation.

Due to this floating bed of solid particles, a good solid-gas contact may be realized and transfer of energy and/or matter between them will be possible. Therefore, the apparatus of FIG. 1 and the process of operating the apparatus are especially suitable for effecting physical and/or chemical reactions and may find application in several fields.

Reaction vessel 1 as shown may have any desired shape in cross-section, although a square cross-section is preferred. Walls 4, 4 of reaction vessel 1 should be slightly inclined with regard to the longitudinal axis 5 of the vessel in order to slow down the velocity of the gas stream in the upper part of the reaction chamber and thus to prevent the solid particles of the floating bed from emerging out of the reaction vessel. The angle of inclination need not be greater than about 10°; a smaller inclination angle within this range will cause a greater number of grids at the bottom portion of the floating bed to be free of a dense phase. If desired, the walls may have a stepped form.

The apparatus of FIG. 4 also comprises an elongated upright reaction vessel 14 which is provided with a gas inlet (not shown) at its bottom and a gas outlet (not shown) at its upper end. The walls 15, 15 of vessel 14 have a vertical position, i.e. they are parallel to the longitudinal axis 16 of the reaction vessel. An elongated body 17 having a gradually diminishing cross-sectional size in upward direction has been arranged centrally within vessel 14. This central body 17 is mounted for up and down movement along arrows B, B and carries a number of grids 18 extending crosswise to the longitudinal axis 16 of vessel 14. A shaftlike reaction chamber 19 which gradually widens (i.e. gradually becomes larger in cross-section) is formed between central body 17 and walls 15, 15 of vessel 14. This reaction chamber 19 is divided into compartments 19a, 19b . . . by grids 18. A storage vessel (not shown) for particulate solids is located below reaction vessel 14 and may be provided with an injector and an inlet for auxiliary gas, just like in the apparatus of FIG. 1. At the start of operations, a particulate solid having a particle size between about 0.5 mm and about 5 mm will be present in the storage vessel (not shown). The particles of this solid are introduced into reaction vessel 14 with the aid of appropriate means such as an injector and an auxiliary gas. Moreover, a gas stream is passed in upward direction along arrow A through the shaftlike reaction chamber 19, at such an output that the solid particles as introduced will attain a floating condition. A floating bed of solid particles is formed in reaction chamber 19, at a higher or lower level dependent from the gas output, and will occupy a number of compartments of reaction chamber 19. The distribution of solid particles within this floating bed is non-homogeneous because the compartments in that bed are filled for the greater part with a thin phase of solid particles and gas whereas a dense phase of solid particles and gas in layer form is present on most of the grids (with the exception of some grids at the bottom of the bed). The solid particles of the dense phase are continuously whirled up, causing part of them to enter the thin phase and another part of them to return to the dense phase. The solid particles in the thin phase move through a compartment along random paths and will sometimes enter a higher or lower compartment. Thus, the individual particles are in continuous movement and the boundaries of the floating bed as well as the division of the bed into dense and thin phases will remain constant during operation. Due to this floating bed of solid particles, a good contact between solids and gas can be realized and transfer of energy and/or matter between them is possible.

Due to the fact that central body 17 is movable up and down along arrows B, B in reaction vessel 14, there is an opportunity to act upon the operational conditions such as the position of the floating bed and the like. This may be advantageous in certain cases. Therefore, the apparatus of FIG. 4 and the process of operating it are especially suitable for performing physical and/or chemical reactions and may find application in several fields.

Reaction vessel 14 and central body 17 of FIG. 4 may have any desired shape in cross-section although a circular cross-section is preferred. Nevertheless, central body 17 should have a gradually diminishing cross-sectional size in upward direction in order to slow down the velocity of the gas stream in the upper part of the reaction chamber and thus to prevent the solid particles of the floating bed from emerging out of the reaction vessel. The angle of inclination between the wall of central body 17 and the (vertical) longitudinal axis 16 need not be greater than about 10°, however. A smaller inclination angle within this range will cause a greater number of grids at the bottom of the floating bed to be free of dense phase.

Particulate solids which have been introduced into the reaction chamber 6 or 14 respectively of the embodiments of FIGS. 1 and 4, will remain in this reaction chamber during operation. A special outlet for solids is not required since the solid particles will fall down through the reaction chamber upon termination or interruption of the upward gas stream and will be received in the storage vessel below the reactor. Nevertheless, a variant is possible wherein the particulate solids are supplied continuously to the reaction chamber and also removed continuously from the reaction chamber during operation. Such a variant, applied to the embodiment of FIG. 1, is shown in FIG. 3.

The apparatus of FIG. 3 comprises a similar reaction vessel 1 as FIG. 1, said vessel having a gas inlet 2, a gas outlet 3 and inclined walls 4, 4. The interior reaction chamber 6 has been divided into compartments by grids 7. A difference with FIG. 1 is that an inlet 19 with valve 20 for particulate solids has been arranged in wall 4 next to the upper end of vessel 1. A corresponding outlet 21 connecting to a storage container 22 outside reaction vessel 1 has been arranged in the same wall but on a lower level. A conduit 23 with valve 24 for an auxiliary gas may serve to create a sub-atmospheric pressure in outlet 21. In that case, a storage vessel below the reactor is unnecessary although it may be present, if desired.

During operation of the apparatus of FIG. 3, a particulate solid is continuously introduced into the reaction vessel via inlet 19 whereas a gas stream is passed in upward direction via inlet 2 and outlet 3 through the reaction chamber 6, at such an output that the solid particles as introduced will attain a floating condition. A floating bed of solid particles is formed in reaction chamber 6, such floating bed being on a higher or lower level in dependency from the gas output and occupying a number of compartments of reaction chamber 6. Good contact between solids and gas is possible in this floating bed and transfer of matter and/or energy may take place. The solid particles getting into the lower portion of the floating bed are continuously removed from reaction chamber 6 through outlet 21. These removed particles may, if desired, be subjected to regeneration or another treatment (e.g. if they have adsorbed a solid or liquid component from the gas stream) and may thereafter be supplied to inlet 19 for reuse. In this way, a circuit of particulate solid may be created by simple means which is advantageous for certain applications such as adsorption processes.

Although outlet 21 of particulate solid in FIG. 3 has been arranged at a lower position than inlet 19 in the wall of reaction vessel 1, a variant can be devised wherein outlet 21 is present at a higher level than inlet 19. The way of operation of the apparatus is not modified thereby. Further, the provisions for continuous supply and removal of the particulate solid may also be applied to the embodiment of FIG. 4 and will render the same advantages there.

Some details of the embodiments of FIGS. 1, 3 and 4 will now be treated.

Grids 7 and 18 may have been constructed in any desired way, for instance as a network of round or square rods (FIG. 1, FIG. 4) or as a perforated plate. Preferably, they should have a free passage of 60–75% in order to create stability in operation. At a free passage of more than 75%, the floating bed within the reaction chamber will become instable since the solid particles will move up and down along great distances then, and at a free passage smaller than 60%, the gas stream through the reaction chamber will be obstructed too much. Further, it is advisory that the openings in the grids are sufficiently large to allow the passage of a number of solid particles, for instance three particles together.

Although six grids have been shown in FIG. 1 and FIG. 4, a greater or smaller number of grids may be used. The distance between the grids will normally be selected such that the reaction chamber is divided into compartments of mutually equal volumes. Using a greater number of grids and consequently a greater number of compartments of smaller volume in a given reaction chamber will cause the movements of the solid particles within the floating bed to become more quiet because these particles are whirled up then over a smaller height.

The particulate solid to be used during operation of the reactor will normally have particles of a size between about 0.5 mm and about 5 mm. At sizes smaller than 0.5 mm, there is a risk that the solid particles will be dragged out of the reaction chamber with the gas stream and at sizes greater than about 5 mm, too much instabilities will occur. The particles are preferably spherical or substantially spherical in order to render the chances of attrition small. The specific gravity of the particles will influence their falling speed, of course, but this specific gravity is not essential to a good functioning of the process and may vary within wide ranges. The amount of solid particles should of course be adapted to the available reactor volume. In practise, good results have been obtained with silica particles of 3.0 mm and 1.8 mm diameter as well as with catalyst particles of 3.0 mm diameter.

The gas stream to be used in operation of the reactor should have an output sufficient to keep the solid particles in floating condition. This means that the gas speed near to the inlet at the bottom part of the reaction chamber should be higher than the falling speed of the particles, such falling speed being dependent inter alia from the particle diameter, the difference in density between particles and gas, and the temperature. The required minimum output may easily be determined experimentally. A maximum output is hard to indicate because it is dependent from the geometry of the reactor and from the mass of the floating bed.

As stated above, the invented process and apparatus may be applied in different fields. One of these applications, namely the removal of $NO_x$ from flue gases, will now be described.

The removal of nitrogen oxides from flue gases may be effected by catalytic reduction of the nitrogen oxides with ammonia to form nitrogen and water vapor according to the equation $$4NO_x + 4NH_3 + O_2 \rightarrow 4N_2 + 6H_2O.$$

The reaction is normally effected at a temperature between 400° and 700° K. in the presence of a solid catalyst. Processes are known wherein a gas stream comprising a mixture of flue gases and ammonia is passed through a solid bed of the catalyst or along a catalyst wall, and processes are known wherein solid catalyst particles flow downwardly within a reactor while a gas stream comprising a mixture of flue gases and ammonia is passed in crosswise direction through the flow of catalyst particles.

Such a reaction may be performed easily with the reactor of FIG. 1. Storage vessel 5 is charged with particulate catalyst and the catalyst particles are supplied to the bottom end of the reactor with the aid of the injector, while a mixture of flue gases and ammonia is passed through the reactor via gas inlet 2 and gas outlet 3 at a speed sufficient to render the catalyst particles in floating condition. The catalyst particles will form a floating bed in the reactor in the aforesaid way, thus making possible a good contact between catalyst and gas mixture and consequently a rapid course of the catalytic reduction reaction.

The invention is further illustrated by the following non-restricting examples.

EXAMPLE I

The apparatus as used comprised a shaftlike reactor of polymethyl methacrylate having a height of 2 meters and a volume of 70 liters. This reactor was of square cross-section, having a width of 10.4 cm at the bottom and 26.0 cm at its upper end. 16 horizontal grids each having a free passage of 67%, had been arranged in the interior at such mutual distances that compartments of 2.5 liter volume were formed between them. The first grid was located at a height of 23 cm and the final grid was located at 125 cm height.

A storage vessel of 5 liters volume for particulate solid was present below the reactor.

In this reactor, experiments with 3 types of spherical solid particles were effected, namely: silica, 3.0 mm in diameter, density 676.6 kg/m$^3$, silica, 1.8 mm in diameter, density 631.5 kg/m$^3$, catalyst, 3.0 mm in diameter, density 866.3 kg/m$^3$.

The catalyst was a commercially available denox catalyst (the same as in Example II).

The gas stream as used was comprised of air and had an output of 400 m$^3$ per hour which could be increased to 500 or 600 m$^3$ per hour for some experiments.

In all experiments, a floating bed of solid particles and gas, composed for the greater part of a thin phase and for a smaller part of a dense phase present in layer form on most of the grids, was formed in the reactor.

The various types of solid particles showed only small differences in behaviour. The solid content within the floating bed was somewhat smaller for the silica particles of 1.8 mm than for the other particle types.

Upon variation of the introduced amount of solid particles, it appeared that the reactor was filled up to greater heights at increasing amounts of solid particles. Each compartment between two grids could only contain a certain amount of solid particles.

Upon increase of the output of the gas stream, it appeared that the floating bed of solid particles extended along a greater number of compartments. Moreover, the floating bed started to form at a higher level in the reactor. The total height of the floating bed was shorter at an increased output because the reaction chamber within the reactor had a greater cross-sectional area at higher levels.

When fly ash was added to the gas stream, this fly ash was dragged with the gas stream through the reactor without being obstructed by the solid particles.

These experiments show that the invented process and apparatus may be utilized with several types of solid particles and a varying conditions.

EXAMPLE II

An apparatus comprising a shaftlike reactor of nitrogen oxides from flue gases. This reactor was of square cross-section, having a width of 9.1 cm at its bottom and 32.5 cm at its upper end. 30 horizontal grids each having a free passage of 67%, had been arranged in the interior space at such mutual distances that compartments of 2.5 liters volume were formed between them. The first grid was located at a height of 16.5 cm and the final grid at a height of 223 cm.

A storage vessel for particulate solid having a volume of 20 liter was present below the reactor.

A catalyst for the reduction of nitrogen oxides (denox catalyst) comprising spherical particles of 3.0 mm in diameter, was used as a particulate solid. The particles were introduced into the reactor chamber with the aid of an injector.

The gas stream as used was composed of flue gases having an addition of ammonia and was supplied to the bottom end of the reactor at an output of 200 Nm$^3$/h and a temperature of 573° K. The composition of the flue gases is shown in the following table:

TABLE 1

| Components: | Volume: |
| --- | --- |
| N$_2$ | 72% |
| H$_2$O | 16% |
| CO$_2$ | 8% |
| O$_2$ | 4% |
| NO$_x$ | 500 ppm |
| NO$_2$ | 10 ppm |
| CO | 5 ppm |
| ash | 10 g/m$^3$ |

A floating bed of solid catalyst particles was formed in the reactor, thus catalytically promoting the reaction between ammonia and nitrogen oxides in the gas stream. The content of remaining nitrogen oxides in the gas stream emerging from the reactor was measured. The results are shown in FIGS. 5 and 6 of the drawing.

FIG. 3 is a representation of the NO$_x$-conversion as function of the amount of catalyst within the reactor. Measurements were effected at a reactor temperature of 573° K. and a molar ratio of 0.8 for NH$_3$/NO$_x$ at the inlet end of the reactor.

FIG. 6 is a representation of the NO$_x$-conversion as function of the molar ratio of NH$_3$/NO$_x$ at the inlet end of the reactor at a temperature of 573° K. and a catalyst amount of 3 kg within the reactor.

The results show that, dependent from the amount of catalyst within the reactor and from the molar ratio NH$_3$/NO$_x$, a NO$_x$-conversion of 0 to 40% may be obtained.

We claim:

1. A process of effecting chemical and/or physical reactions by means of solid-gas contact, comprising the steps of:

providing a reactor vessel having an upwardly diverging reaction chamber in an upper portion of said reaction vessel, said reaction chamber further comprising grids arranged crosswise to permit particulate solids of approximately 0.5–5 mm to freely pass among the compartments through said grids, introducing said particulate solid having a particle size between approximately 0.5 and approximately 5 mm into an upwardly diverging reaction chamber which is divided into compartments by means of grids arranged crosswise to its longitudinal axis, and passing a gas stream in an upward direction through the reaction chamber at an velocity sufficient to keep the particulate solid suspended within the reaction chamber to accomplish the desired reactions through solid-gas contact and allowing the particulate solid to pass among said compartments through said grids, with said particulate solid distributed non-homogeneously throughout the reaction chamber.

2. The process as claimed in claim 1, wherein the particulate solid is substantially spherical.

3. The process as claimed in claim 1, wherein the particulate solid comprises silica having a particle size of 3.0 mm or 1.8 mm.

4. The process as claimed in claim 1, wherein a mixture of two particulate solids is used.

5. The process as claimed in claim 1, wherein fresh particulate solid is continuously supplied to the reaction chamber and spent particulate solid is continuously removed from the reaction chamber during operation.

6. An apparatus for effecting chemical and/or physical reactions by means of solid-gas contact, said apparatus comprising an elongated upright reaction vessel having an upper end and a lower end with walls extending parallel to the longitudinal axis of the vessel, as well as an elongated upwardly converging central body arranged coaxially inside the reaction vessel, with grids located in the space between the central body and the walls of the reaction vessel and arranged cross-wise to the longitudinal axis of the vessel, said grids dividing the inner space of the vessel into compartments.

7. The apparatus as claimed in claim 6, wherein the reaction vessel and the central body are circular in cross-section.

8. The apparatus as claimed in claim 6, wherein the central body has walls which enclose an inclination angle of at most 10° with the longitudinal axis of the central body.

9. The apparatus as claimed in claim 6, wherein the central body inside the reactor vessel has been mounted for up and down movement and wherein the grids have been secured only to the central body.

10. The apparatus as claimed in any of claims 6-9, wherein 60-75% of the surface area of the grids within the reaction chamber is open to free passage of the particulate solid.

11. The apparatus as claimed in any of claims 6-9, wherein the particulate solid inlet is located at said lower end of the reaction vessel.

12. The apparatus as claimed in claim 11, wherein the particulate solid inlet includes a gas injector.

13. The apparatus as claimed in any of claims 6-9, wherein the particulate solid inlet is located at a first position in the reactor wall, with a particulate solid outlet located at a second position in the reactor wall vertically spaced from the first position.

14. A process for the removal of nitrogen oxides from flue gases, comprising the steps of providing a reactor vessel having an upwardly diverging reaction chamber in an upper portion of said reaction vessel, said reaction chamber further comprising grids arranged crosswise to permit particulate solids of approximately 0.5-5 mm to freely pass among the compartments through said grids, introducing a particulate solid catalyst having a particle size between approximately 0.5 mm and approximately 5 mm into said upwardly diverging reaction chamber which is divided into compartments by means of grids arranged crosswise to its longitudinal axis, and moreover passing a mixture of flue gases and ammonia in an upward direction through said reaction chamber at an velocity which keeps the catalyst particles suspended to effect a conversion of nitrogen oxides from the flue gases with ammonia under catalyst action wherein said particulate solid catalyst passes freely from one compartment to another through said grids.

* * * * *